US 11,059,329 B2

(12) United States Patent
Misani et al.

(10) Patent No.: US 11,059,329 B2
(45) Date of Patent: Jul. 13, 2021

(54) TYRE FOR MOTORCYCLE WHEELS

(71) Applicant: PIRELLI TYRE S.P.A., Milan (IT)

(72) Inventors: Pierangelo Misani, Milan (IT); Mario Mariani, Milan (IT); Luca Bruschelli, Milan (IT); Aline Ringis Pin, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 424 days.

(21) Appl. No.: 15/767,617

(22) PCT Filed: Oct. 25, 2016

(86) PCT No.: PCT/IB2016/056407
§ 371 (c)(1),
(2) Date: Apr. 11, 2018

(87) PCT Pub. No.: WO2017/077419
PCT Pub. Date: May 11, 2017

(65) Prior Publication Data
US 2018/0272807 A1    Sep. 27, 2018

(30) Foreign Application Priority Data

Nov. 4, 2015  (IT) .................. 102015000068832

(51) Int. Cl.
*B60C 11/03*     (2006.01)
*B60C 11/00*     (2006.01)

(52) U.S. Cl.
CPC ........ *B60C 11/033* (2013.01); *B60C 11/0302* (2013.01); *B60C 11/032* (2013.01);
(Continued)

(58) Field of Classification Search
CPC ................. B60C 11/033; B60C 11/032; B60C 2011/0372; B60C 2200/10; B60C 2200/12
See application file for complete search history.

(56) References Cited

U.S. PATENT DOCUMENTS

2006/0219342 A1   10/2006   Steinbach
2008/0196806 A1    8/2008   Matrascia et al.
(Continued)

FOREIGN PATENT DOCUMENTS

CN    204526666 U       8/2015
JP    S63121505    *    5/1988
(Continued)

OTHER PUBLICATIONS

Non-Final Office Action for U.S. Appl. No. 15/767,998, filed Apr. 12, 2018 on behalf of Pirelli Tye SPA, dated Apr. 28, 2020. 16 pages.
(Continued)

*Primary Examiner* — Alison L Hindenlang
*Assistant Examiner* — Debjani Roy
(74) *Attorney, Agent, or Firm* — Steinfl + Bruno LLP

(57) ABSTRACT

A motorcycle tyre intended to be fitted to the rear wheel of a motorcycle. The motorcycle tyre has a tread pattern with a high void-to-rubber ratio that provides a suitable draining. The tread pattern has pairs of primary grooves to carry out the draining function of the tyre, and arranged substantially according to the stress lines of the tyres to reduce the probability of triggering uneven wear. Also included are secondary grooves having a reduced dimension, in terms of both extension and width, arranged between the primary grooves to increase the grip of the tyre to the ground. Orientation of the secondary grooves increases stabilizing features against drift forces acting on the tyre, particularly in low or very low friction conditions.

19 Claims, 4 Drawing Sheets

(52) U.S. Cl.
CPC .............. *B60C 2011/0033* (2013.01); *B60C 2011/0358* (2013.01); *B60C 2011/0374* (2013.01); *B60C 2200/10* (2013.01); *B60C 2200/14* (2013.01)

(56) References Cited

U.S. PATENT DOCUMENTS

| | | | |
|---|---|---|---|
| 2009/0078349 A1* | 3/2009 | Nakagawa | B60C 11/0311 152/209.11 |
| 2010/0282390 A1 | 11/2010 | Mariani et al. | |
| 2011/0247738 A1* | 10/2011 | Mariani | B60C 11/0083 152/209.8 |
| 2012/0118456 A1 | 5/2012 | Schiavolin et al. | |
| 2014/0182757 A1* | 7/2014 | Mariani | B60C 11/033 152/209.8 |
| 2014/0230978 A1 | 8/2014 | Misani et al. | |
| 2018/0264886 A1 | 9/2018 | Bruschelli et al. | |
| 2018/0304694 A1 | 10/2018 | Misani et al. | |

FOREIGN PATENT DOCUMENTS

| | | |
|---|---|---|
| JP | S63121505 A | 5/1988 |
| JP | 2004224249 A | 8/2004 |
| JP | 2011189805 A | 9/2011 |
| WO | 2010/041283 A1 | 4/2010 |
| WO | 2010/073279 A1 | 7/2010 |
| WO | 2011/012980 A1 | 2/2011 |
| WO | 2011/041859 A1 | 4/2011 |
| WO | 2011/08566 A1 | 7/2011 |
| WO | WO-2011080566 A1 * 7/2011 ......... B60C 11/0302 |
| WO | 2013/021271 A1 | 2/2013 |
| WO | 2015/097582 A1 | 7/2015 |
| WO | 2017/064585 A1 | 4/2017 |
| WO | 2017/077418 A1 | 5/2017 |

OTHER PUBLICATIONS

Non-Final Office Action for U.S. Appl. No. 15/764,856, filed Mar. 29, 2018 on behalf of Pirelli Tyre S.P.A. dated Apr. 9, 2020. 11 Pages.
International Search Report and Written Opinion for International Application No. PCT/IB2016/055822 filed Sep. 29, 2016 on behalf of Pirelli Tyre S.P.A. dated Jan. 13, 2017. 10 pages.
International Search Report and Written Opinion for International Application No. PCT/IB2016/056407 filed Oct. 25, 2016 on behalf of Pirelli Tyre S.P.A. dated Feb. 3, 2017. 10 pages.
International Search Report and Written Opinion for International Application No. PCT/IB2016/056405 filed Oct. 25, 2016 on behalf of Pirelli Tyre S.P.A. dated Feb. 3, 2017. 10 pages.

* cited by examiner

TYRE FOR MOTORCYCLE WHEELS

CROSS REFERENCE TO RELATED APPLICATIONS

The present application is the U.S. National Stage of International Patent Application No. PCT/IB2016/056407 filed on Oct. 25, 2016 which, in turn, claims priority to Italian Application No. 102015000068832 filed on Nov. 4, 2015.

FIELD OF THE INVENTION

The present invention relates to tyres for motorcycle wheels.

In particular, the present invention relates to tyres intended to be fitted to the rear wheel of motorcycles of the "Sport Touring" type, i.e. sport motorcycles intended to provide high performance in terms of power, comfort and mileage, designed for use on different kinds of routes and in different road surface conditions.

Typically, the "Sport Touring" motorcycles are motorcycles having large engine capacity (e.g. 800 cm3 or larger), and/or high power (e.g. 100-120 hp or higher).

PRIOR ART

Tyres for motorcycles of the "Sport Touring" type are described for example in the following patent applications to the Applicant WO2010073279, WO2011080566, WO2011012980.

SUMMARY OF THE INVENTION

Tyres for motorcycles of the "Sport Touring" type are required to provide high versatility of use. In particular, they are required to provide grip and traction ability on the road surface for allowing an optimal power transfer, as well as a suitable braking action, even with a load of two persons and on any kind of road surface, such as for example wet, dry, regular and/or irregular asphalt, and/or of routes, such as for example urban roads, motorways, mountain roads with many bends.

Such tyres are also required to provide comfort, stability, controllability, steerability, high mileage and wear evenness.

The Applicant has observed that to date, because of the large number of often mutually contrasting features required from these tyres, the manufacturers have focused their efforts in order to provide "Sport Touring" tyres which are optimized in terms of stability, handling, grip on dry ground, draining, mileage, and wear evenness, sometimes to the detriment of an optimal braking grip in low or very low friction conditions, particularly on wet ground.

In particular, the Applicant is of the opinion that a sudden and/or unexpected reduction of grip on the road surface may endanger the ability to control the vehicle.

The Applicant has thus felt the need to provide a Sport Touring tyre which has excellent features in terms of stability, handling, draining, grip on dry ground, and nevertheless allows improving the grip on road surfaces characterized by low friction, such as for example concrete, worn asphalt or cobblestone pavement, particularly in wet conditions.

More particularly, the Applicant has observed that for obtaining good braking features on a road surface characterized by low friction, one typically acts so as to increase the braking grip of the front tyre.

The Applicant has, however, observed that a front tyre of this kind may penalize the behavior of the rear tyre.

While braking, in fact, the motorcycle undergoes a greater deceleration and load transfer from the rear tyre to the front tyre, which make keeping the motorcycle on trajectory on the rear wheel particularly difficult. The resulting instability and difficult control of the motorcycle may significantly increase if the braking occurs on a road surface which provides low grip.

The Applicant has thus faced the problem of providing a Sport Touring tyre intended to be fitted to the rear wheel of a tyre which, when braking particularly on road surfaces characterized by low grip (e.g. on wet ground), allows to effectively counteract the drift forces acting on the motorcycle and capable of changing its trajectory.

In a first aspect thereof, the invention relates to a motorcycle tyre, comprising an equatorial plane and a tread band, wherein:

the tread band comprises a plurality of grooves defining a tread pattern;

the grooves of the tread pattern overall define on said tread band a void-to-rubber ratio equal to or greater than 10%, preferably equal to or greater than 12%;

the tread band comprises a plurality of pairs of primary grooves and a plurality of pairs of groups of secondary grooves;

the pairs of primary grooves are repeated along a direction of circumferential development of the tyre;

the primary grooves of each pair are mutually oppositely inclined relative to the equatorial plane of the tyre;

the primary grooves extend away from the equatorial plane and have an inclination angle relative to the equatorial plane smaller than 90°;

the primary grooves have a length equal to or greater than 50% of the width of the tread band;

each group of secondary grooves comprises at least two secondary grooves;

the secondary grooves of each group are located between the primary grooves so as to extend axially away from the equatorial plane and have an inclination angle relative to the equatorial plane greater than 90°.

The Applicant has made a tyre having a high void-to-rubber ratio which provides a suitable draining. Moreover, the tread pattern is provided with pairs of primary grooves, having considerable extension, which mainly carry out the draining function of the tyre. Preferably, the primary grooves are arranged substantially according to the stress lines of the tyre, thus noticeably reducing the probability of triggering irregular wear, to the advantage of the tyre mileage. Moreover, the presence of secondary grooves having a limited dimension, preferably in terms of both extension and width, suitably arranged between the primary grooves, increases the grip of the tyre to the ground, while their orientation increases its stabilizing features against the drift forces acting on the tyre, above all when running on a ground which provides low or very low friction (above all while braking).

By "tread pattern" it is meant the representation of each point of the tread band (grooves included) on a plane perpendicular to the equatorial plane of the tyre and tangent to the maximum diameter of the tyre.

Angular measurements, and/or linear quantities (distances, widths, lengths, etc.), and/or areas are to be intended as referred to the tread pattern as defined above.

Referring to the angular arrangement of the grooves and/or recesses formed in the tread band relative to the equatorial plane of the tyre, such an angular arrangement is to be intended, for each point of the groove and/or recess, as referred to the angle (comprised between 0° and 180°) defined by a rotation made starting from the equatorial plane up to the direction tangent to the groove and/or recess passing through that point. Considering a tyre adapted to be fitted to the rear wheel of a motorcycle, the rotation is meant to be performed by a vector initially lying along the direction defined in the tread pattern by the equatorial plane, and oriented oppositely to the predetermined rotation direction of the tyre.

By "motorcycle tyre" it is meant a tyre having a high curvature ratio (typically greater than 0.20), which allows high camber angles to be reached when the motorcycle runs on a bend.

By "equatorial plane" of the tyre it is meant a plane perpendicular to the rotation axis of the tyre and dividing the tyre into two equal portions.

By "circumferential" direction it is meant a direction generically directed according to the rotation direction of the tyre, or in any case only slightly inclined relative to the rotation direction of the tyre.

By "void-to-rubber ratio" it is meant the ratio between the total area of the grooves of a determined portion of the tread pattern of the tyre (possibly of the whole tread pattern) and the total area of the same portion of the tread pattern (possibly of the whole tread pattern).

By "curvature ratio" of the tyre it is meant the ratio between the distance of the radially highest point of the tread band from the maximum cross section width (also called maximum chord) of the tyre, and the same maximum width of the tyre, in a cross section of the tyre.

By "maximum cross section width" (or maximum chord) it is meant the maximum width of the tyre profile, in other words the length of the segment whose ends are the axially outermost points of the tread profile.

The present invention, in one or more preferred aspects thereof, my comprise one or more of the features hereinafter presented.

Advantageously, the secondary grooves do not have intersection points with the circumferentially adjacent primary grooves.

Preferably, the secondary grooves may have inclination angles relative to the equatorial plane which decrease moving away from the equatorial plane.

Conveniently, each secondary groove may have a length equal to or smaller than 5% of the width of the tread band, preferably may have a length equal to or smaller than 3% of the width of the tread band.

Preferably, the secondary grooves of each group may be located substantially along an at least partially curved line which is counter-inclined relative to the primary grooves.

Advantageously, the line along which the secondary grooves of a same group of secondary grooves are located may cross n primary grooves, with n>1.

Advantageously, for not causing tread band to be excessively soft, each secondary groove may have a depth equal to or smaller than 5 mm, preferably each secondary groove has a depth equal to or smaller than 3 mm. Preferably, the width of the secondary grooves is smaller than the width of the primary grooves.

Conveniently, each secondary groove located close to a shoulder may have a distance from the shoulder equal to or greater than 20% of the width of the tread band.

Preferably, each secondary groove located close to a shoulder has an inclination angle relative to the equatorial plane equal to or smaller than 135°.

Preferably, each secondary groove located close to the equatorial plane may have an inclination angle greater than 160°.

Preferably, each primary groove does not have intersection points with the circumferentially consecutive primary grooves.

Preferably, the primary grooves may have a starting inclination angle, close to the end thereof pointing towards the equatorial plane, of about 20°.

Preferably, the primary grooves may have a final inclination angle, close to the end thereof pointing towards a shoulder, of about 40°.

Preferably, the primary grooves may have a width which increases moving away from the equatorial plane.

Conveniently, the secondary grooves of a same group of secondary grooves may be interposed between circumferentially consecutive primary grooves, so that there is always at least one secondary groove between two circumferentially consecutive primary grooves.

Conveniently, the contribution of the secondary grooves to the void-to-rubber ratio of the tread band is equal to or less than 6%.

Preferably, the tread band may comprise a central annular portion located across the equatorial plane having a void-to-rubber ratio equal to or smaller than 1%. Advantageously, the tread band may comprise two shoulder annular portions opposed to each other relative to the equatorial plane and located at the outer edges of the tyre, said shoulder annular portions having a void to rubber ratio equal to or smaller than 1%.

BRIEF DESCRIPTION OF THE DRAWINGS

Further features and advantages of the invention shall become clearer from the detailed description of some preferred, although not exclusive, embodiments of a motorcycle tyre according to the present invention.

Such description shall be made hereafter with reference to the accompanying drawings, provided only for indicating, and thus non-limiting, purposes, wherein.

DETAILED DESCRIPTION OF EMBODIMENTS OF THE INVENTION

Figure 1:
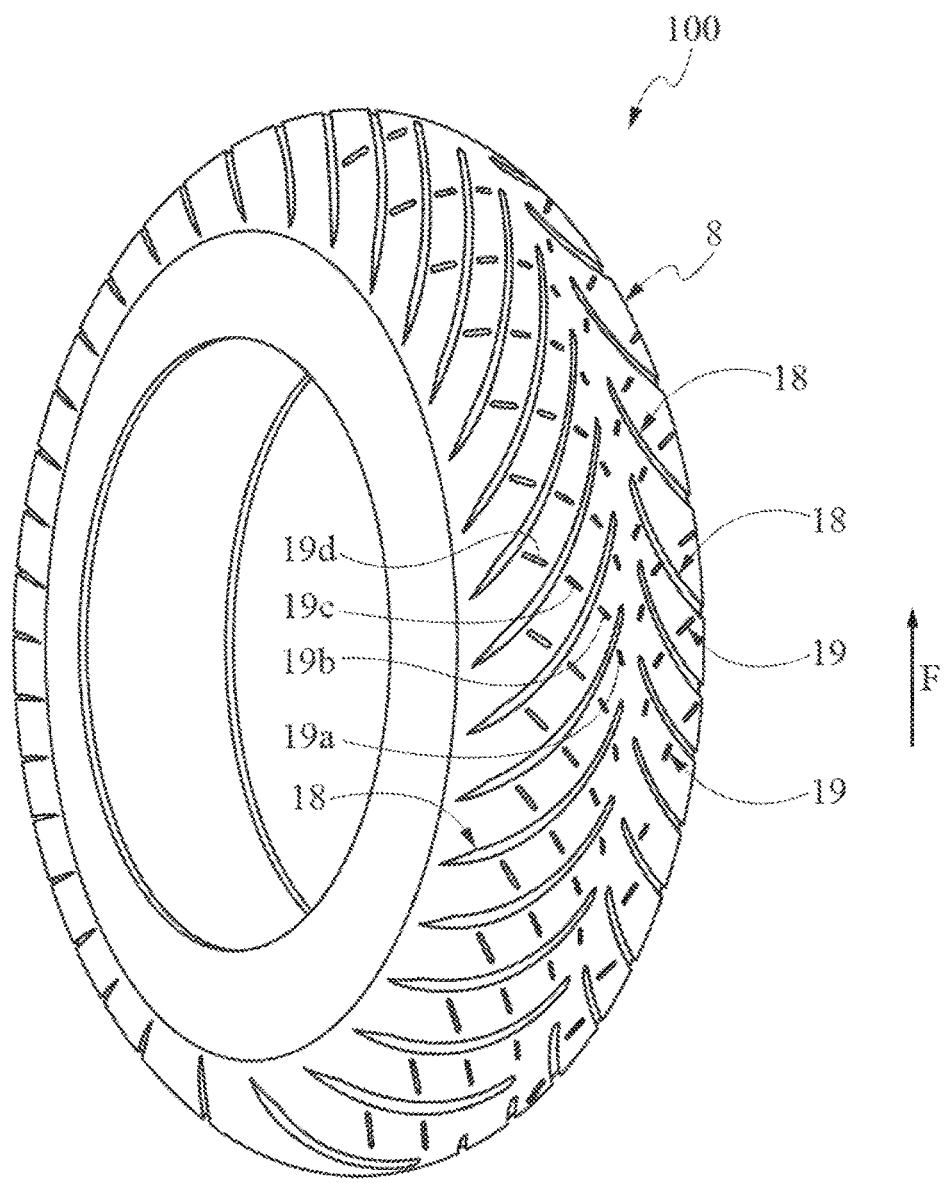
FIG. 1 shows a perspective view of a first example of a tyre according to the invention.
Figure 2:
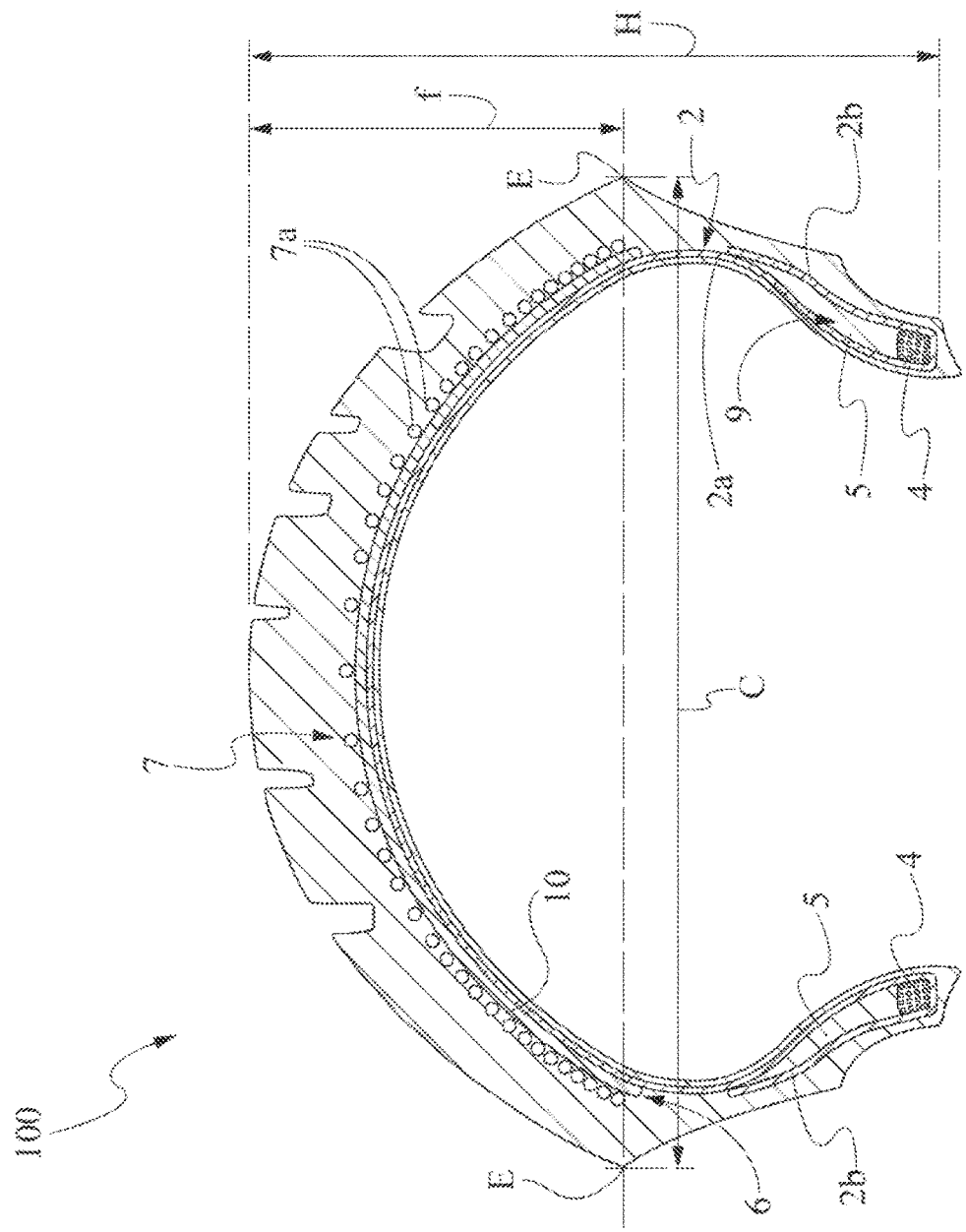
FIG. 2 is a radial section view of the tyre of FIG. 1.

In FIGS. 1 and 2 a tyre for motorcycle wheels according to the present invention is generally indicated at 100. The tyre is preferably intended to be used on a rear motorcycle wheel, in a motorcycle having large engine capacity, e.g. 600-800 cc and larger.

An equatorial plane X-X and a rotation axis (not shown), orthogonal to the equatorial plane, are defined in the tyre 100. Moreover, there are defined a circumferential direction (indicated in the figures by an arrow F pointing in the rotation direction of the tyre) and an axial direction perpendicular to the equatorial plane X-X.

The tyre 100 comprises a carcass structure 2 including at least one carcass layer 2a, made of an elastomeric material and comprising a plurality of reinforcing elements arranged parallel to one another.

The at least one carcass layer engages, by means of opposite circumferential edges thereof, also superimposed, at least one annular reinforcing structure 9.

In particular, the opposite lateral edges of the at least one carcass layer 2a are turned up about annular reinforcing structures, called bead rings 4.

A tapered elastomeric filling 5 taking up the space defined between the carcass layer 2a and the respective turned-up lateral edge 2b of the carcass layer 2a is applied onto the axially outer perimeter edge of the bead rings 4.

The tyre region comprising the bead ring 4 and the filling 5 forms the so-called bead, intended for anchoring the tyre to a respective fitting rim, not shown.

Still referring to the embodiment shown in FIG. 2, the reinforcing elements included in the carcass layer 2a preferably comprise textile cords, selected from those usually adopted in the manufacture of carcasses for tyres, for example Nylon, Rayon, PET, PEN, Lyocell cords, with an elementary filament having a diameter of between 0.35 mm and 1.5 mm, or steel metal cords with an elementary filament having a diameter of between 0.10 mm and 0.5 mm.

In an embodiment not shown, the carcass structure has its opposite lateral edges associated without a turn-up with special annular reinforcing structures provided with two annular inserts. A filling of elastomeric material may be located in an axially outer position relative to the first annular insert. The second annular insert is instead located in an axially outer position relative to the end of the carcass layer. Finally, in an axially outer position relative to said second annular insert, and not necessarily in contact with the same, a further filling may be provided which terminates the formation of the annular reinforcing structure.

A tread band 8 is circumferentially applied, in a radially outer position, on the carcass structure 2. Longitudinal and/or transverse grooves, arranged so as to define a desired tread pattern, are typically formed on the tread band 8 further to a molding operation carried out at the same time with the vulcanization of the tyre.

The tyre 100 may comprise a pair of sidewalls laterally applied on opposite sides to said carcass structure 2.

The tyre 100 has a cross section characterized by a high transverse curvature.

In particular, the tyre 100 has a section height H measured, at the equatorial plane, between the top of the tread band and the fitting diameter, identified by the line passing through the tyre beads.

The tyre 100 further has a maximum cross section width C defined by the distance between the laterally opposite ends E of the tread profile, and a curvature defined by the specific value of the ratio between the distance f of the top of the tread from the line passing through the ends E of the tread itself, measured at the equatorial plane of the tyre, and the aforesaid maximum width C. The ends E of the tread may be formed by a corner.

In the present description and in the subsequent claims, by high curvature tyres, tyres are meant which have a curvature ratio f/C not smaller than 0.20, preferably f/C≥0.25, for example 0.28. Preferably, such curvature ratio f/C is not greater than 0.8, preferably f/C≤0.5.

Preferably, the tyres have particularly low sidewalls (FIG. 1). In other words, by tyres with low or lowered sidewalls, tyres are meant in which the sidewall height ratio (H-f)/H is smaller than about 0.7, more preferably smaller than about 0.65, for example smaller than or equal to about 0.6.

The carcass structure 2 is typically lined on its inner walls with a sealing layer, or so-called "liner", essentially consisting of a layer of an airtight elastomeric material, adapted to ensure the tight seal of the tyre itself after it has been inflated.

Preferably, the belt structure 6 consists of a layer 7 having a plurality of circumferential windings 7a axially arranged in side-by-side relationship, formed by a rubberized cord or by a strip comprising a number (preferably, from two to five) of rubberized cords, spirally wound at an angle substantially equal to zero (typically between 0° and 5°) relative to the equatorial plane X-X of the tyre. Preferably, the belt structure extends substantially over the whole crown portion of the tyre. In a further embodiment, the belt structure 6 may comprise at least two radially superimposed layers, each consisting of elastomeric material reinforced with cords arranged parallel to one another. The layers are arranged so that the cords of the first belt layer are oriented obliquely relative to the equatorial plane of the tyre, whereas the cords of the second layer also have an oblique orientation, but symmetrically crossed relative to the cords of the first layer (so-called "cross-belt").

In both cases, generally, the cords of the belt structure are textile or metallic cords. Preferably, the tyre 100 may comprise a layer 10 of elastomeric material, located between said carcass structure 2 and said belt structure 6 formed by said circumferential coils, said layer 10 preferably extending over an area substantially corresponding to the area on which the belt structure 6 develops. Alternatively, said layer 10 extends over an area which is smaller than the area on which the belt structure 6 develops, for example only over opposite lateral portions thereof.

In a further embodiment, an additional layer (not shown in FIG. 2) of elastomeric material is located between said belt structure 6 and said tread band 8, said layer preferably extending over an area substantially corresponding to the area on which said belt structure 6 develops. Alternatively, said layer extends only over at least a portion of the development of the belt structure 6, for example over opposite lateral portions thereof.

In a preferred embodiment, at least one of said layer 10 and said additional layer comprises a reinforcing material, for example aromatic polyamide fibers, dispersed in said elastomeric material.

Figure 3:
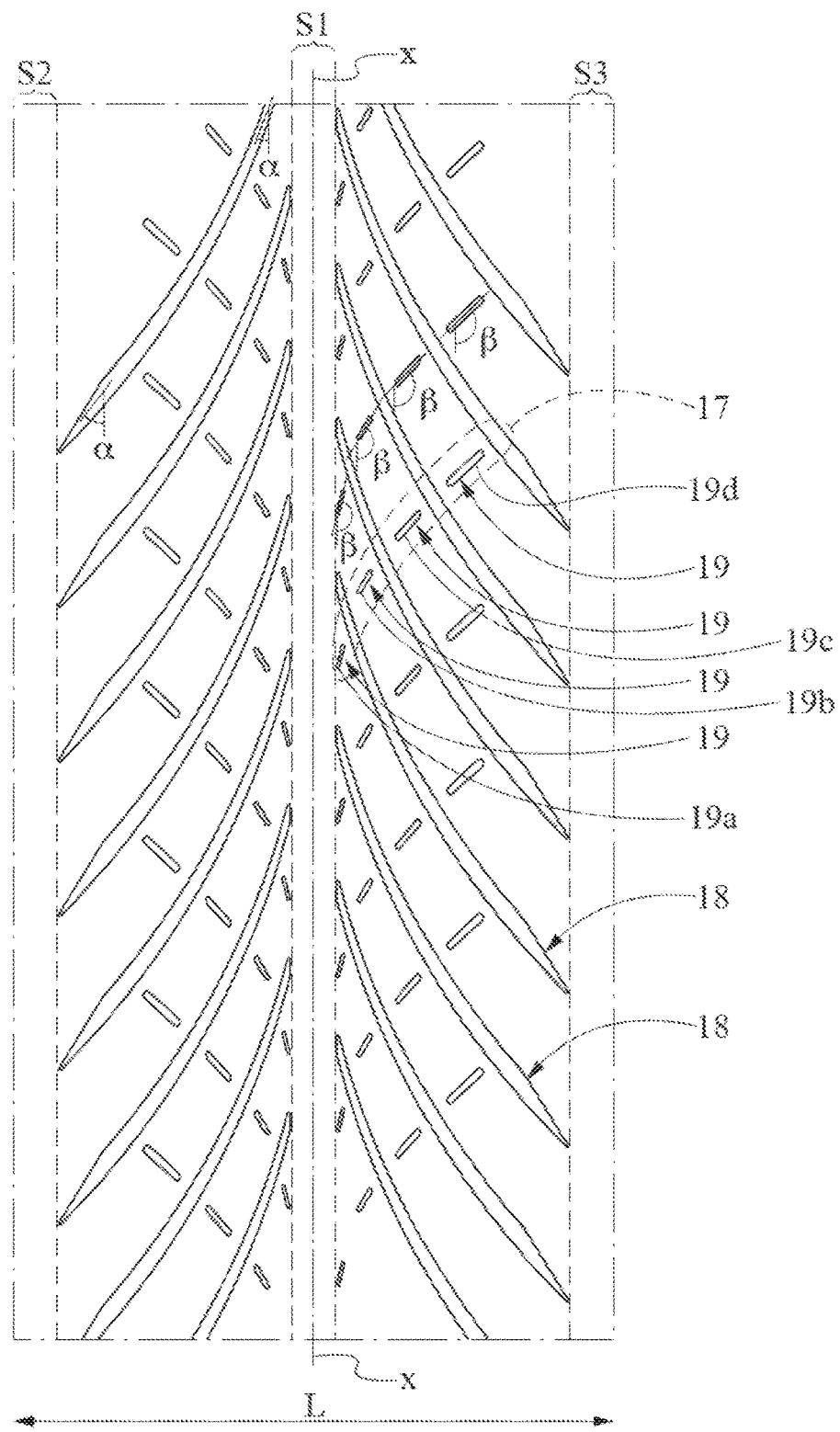
FIG. 3 is a schematic plan view of a portion of the tread band of the tyre of FIG. 1.

As better shown in FIG. 3, on the tread band 8 a tread pattern is formed comprising a plurality of grooves, which overall define on the tread band a void-to-rubber ratio greater than 10%, preferably greater than 12%.

Preferably, for providing the tread band with a suitable stiffness without limiting its draining ability, the grooves overall define on the tread band a void-to-rubber ratio smaller than 22%, preferably smaller 20%.

For providing a suitable balance between grip and probability of triggering uneven wear and/or excessive mobility of the tread band, the contribution of the secondary grooves alone to the void-to-rubber ratio of the tread band is equal to or smaller than 6%. Referring to FIGS. 1, 3, the tread band 8 comprises a plurality of pairs of primary grooves 18 and a plurality of pairs of groups 17 of secondary grooves 19.

The pairs of primary grooves 18, as well as the pairs of groups 17 of secondary grooves are repeated along a direction of circumferential development of the tyre.

Referring to the embodiment shown in FIGS. 1-3, it can be seen that the pairs of primary grooves 18 are located circumferentially alternated with the pairs of groups 17 of secondary grooves 19.

Preferably, the primary grooves 18 of each pair are circumferentially mutually staggered.

Preferably, the secondary grooves 19 of each pair of groups 17 of secondary grooves are circumferentially mutually staggered.

Referring to the embodiment shown in FIGS. 1-3, the secondary grooves 19 of a same group 17 of secondary grooves may be interposed between circumferentially consecutive primary grooves 18 so that between two circumferentially consecutive primary grooves 18 there is always at least one secondary groove 19.

Advantageously, for increasing the grip to the ground, the tread band 8 may comprise a first central annular portion S1 located across the equatorial plane X-X axially extending over no more than 10% of the width L of the tread band and having a void-to-rubber ratio equal to or smaller than 1%.

On the other hand, for providing a good stiffness and therefore a suitable response of the tyre when driving at the maximum lean angle, the tread band 8 may comprise two second annular portions S2, S3, each axially extending over no more than 10% of the width L of the tread band and having a void to rubber ratio equal to or smaller than 1%. The two second annular portions S2, S3 are oppositely located relative to the equatorial plane X-X and each of them is located substantially at a shoulder of the tyre.

The primary grooves 18 of each pair are oppositely located relative to the equatorial plane X-X and extend axially away from the equatorial plane X-X.

The primary grooves have a considerable dimension. In particular, each primary groove 18 extends over at least 50% of the width L of the tread band 8, preferably at least 60% of the width L.

Referring to the embodiment shown in FIGS. 1, 3, each primary groove 18 extends away from the equatorial plane X-X so that the inclination angle α relative to the equatorial plane X-X increases.

Still referring to the embodiment shown in FIGS. 1-3, the inclination angle α varies between 15° and 60°, preferably between 20° and 40°.

In particular, the inclination angle α is equal to about 20° close to an end of the first groove 18 pointing towards the equatorial plane X-X, and increases substantially gradually moving away from the equatorial plane X-X, up to reaching a value of about 40° at another end located close to the shoulder 40°.

Referring to the embodiment shown in FIGS. 1, 3, each primary groove 18 extends substantially continuously along an at least partially curved line, preferably along an arc of a circumference.

The considerable extension of the primary grooves 18 together with their arrangement, preferably substantially according to the stress lines of the tyre, provides suitable draining and reduces at the same time the probability of triggering uneven wear, to the advantage of the tyre mileage.

Preferably, the primary grooves 18 have a decreasing depth, which gets smaller moving from the equatorial plane X-X towards the shoulders. Preferably, the primary grooves 18 have a depth smaller than or equal to 7 mm. The depth of the primary grooves 18 gradually decreases moving towards the shoulders of the tyre, in order to increase the compactness of the tread band 8 and the lateral thrust when running on a bend at the maximum lean angle on dry ground.

According to the embodiment shown in FIGS. 1-3, for providing a good draining of water at high lean angles, the primary grooves 18 have a width which substantially increases moving from the equatorial plane X-X towards the shoulders. Preferably, the primary grooves 18 have a width greater than or equal to 3 mm.

Preferably, the primary grooves 18 have a width smaller than or equal to 7 mm.

In the embodiment shown in FIGS. 1-3, the point at which the primary grooves 18 reach their maximum width is not located at the end of the primary groove 18 pointing towards the shoulder, being instead slightly spaced away therefrom.

Preferably, the primary grooves 18 have a width which increases moving away from the equatorial plane X-X over 9/10 of their extension.

In the last portion of the primary groove 18, i.e. the portion at the end of the primary groove 18 which points towards the shoulder, for reducing the probability of triggering uneven wear, the groove width decreases again up to becoming substantially zero. The secondary grooves 19 are arranged in pairs of groups 17 of secondary grooves. Two groups 17 of the same pair extend oppositely relative to the equatorial plane X-X. The secondary grooves 19 of each group 17 are arranged so as to extend away from the equatorial plane X-X.

Each group 17 of secondary grooves 19 comprises at least two secondary grooves 19. In the embodiment shown in FIGS. 1-3, each group 17 of secondary grooves has four secondary grooves 19.

Preferably, the secondary grooves 19 of a same group 17 of secondary grooves may be interposed between circumferentially consecutive primary grooves 18 so that between two circumferentially consecutive primary grooves 18 there is always a secondary groove 19.

In detail, moving away from the equatorial plane X-X each group 17 of secondary grooves has a first 19a, a second 19b, a third 19c and a fourth 19d secondary groove. The secondary grooves 19 of each group 17 have a more limited extension than that of the primary grooves 18.

In particular, each secondary groove 19 extends at most over 4% of the width L of the tread band 8, preferably at most over 3% of the width L of the tread band 8.

Each secondary groove 19 does not have intersection points with the primary grooves 18.

Preferably, according to the embodiment shown in FIGS. 1-3, each secondary groove 19 is arranged between two circumferentially consecutive primary grooves 18 so as not to intersect them.

Referring to the embodiment shown in FIGS. 1, 3, the secondary grooves 19 of each group 17 of second grooves 19 are located substantially along an at least partially curved line, preferably along an arc of a circumference.

Advantageously, the line along which the secondary grooves of a same group of secondary grooves are located may cross n primary grooves 18, with n>1.

According to an alternative embodiment, not shown, more than one secondary groove 19 of the same group 17 of secondary grooves 19 may be located between two circumferentially consecutive primary grooves 18.

The secondary grooves 19 of each group 17 of second grooves has an inclination angle β relative to the equatorial plane X-X which decreases moving away from the equatorial plane X-X.

The Applicant has found that at small lean angles, i.e. lean angles smaller than 15°, by arranging the secondary grooves 19 along an at least partially curved line, preferably substantially aligned with stress lines of the tyre, it is possible to provide a greater resistance to lateral forces, such as the drift forces, acting on the rear tyre while braking, the braking action being mainly carried out by the front wheel.

A greater resistance to lateral forces acting on the rear tyre while braking results in a greater stability of the tyre and a better ability to keep the vehicle trajectory.

In detail, the first secondary grooves 19a, i.e. those located closer to the equatorial plane X-X, have an inclination angle relative to the equatorial plane X-X of between 160° and 180°.

The second secondary grooves 19b have an inclination angle β relative to the equatorial plane X-X of between 155° and 165°.

The third secondary grooves 19c have an inclination angle β relative to the equatorial plane X-X of between 145° and 155°.

The fourth secondary grooves 19d have an inclination angle β relative to the equatorial plane X-X of between 135° and 145°.

In the embodiment shown in FIGS. 1, 3 the secondary grooves 19 have a depth smaller than or equal to 6 mm.

According to the embodiment shown in FIGS. 1-3, for allowing a good draining of water at high lean angles, the secondary grooves 19 do not have a constant width. They have instead a width which substantially increases from the equatorial plane X-X towards the shoulder. Preferably, the secondary grooves 19 have a width smaller than the width of the primary grooves. The secondary grooves have a width smaller than 5 mm, preferably greater than or equal to 2 mm.

The Applicant has found out that such an arrangement and configuration of the secondary grooves 19 allows the tread band to be made locally less stiff, which results in a greater grip of the tyre to the ground.

EXAMPLE

Figure 4:
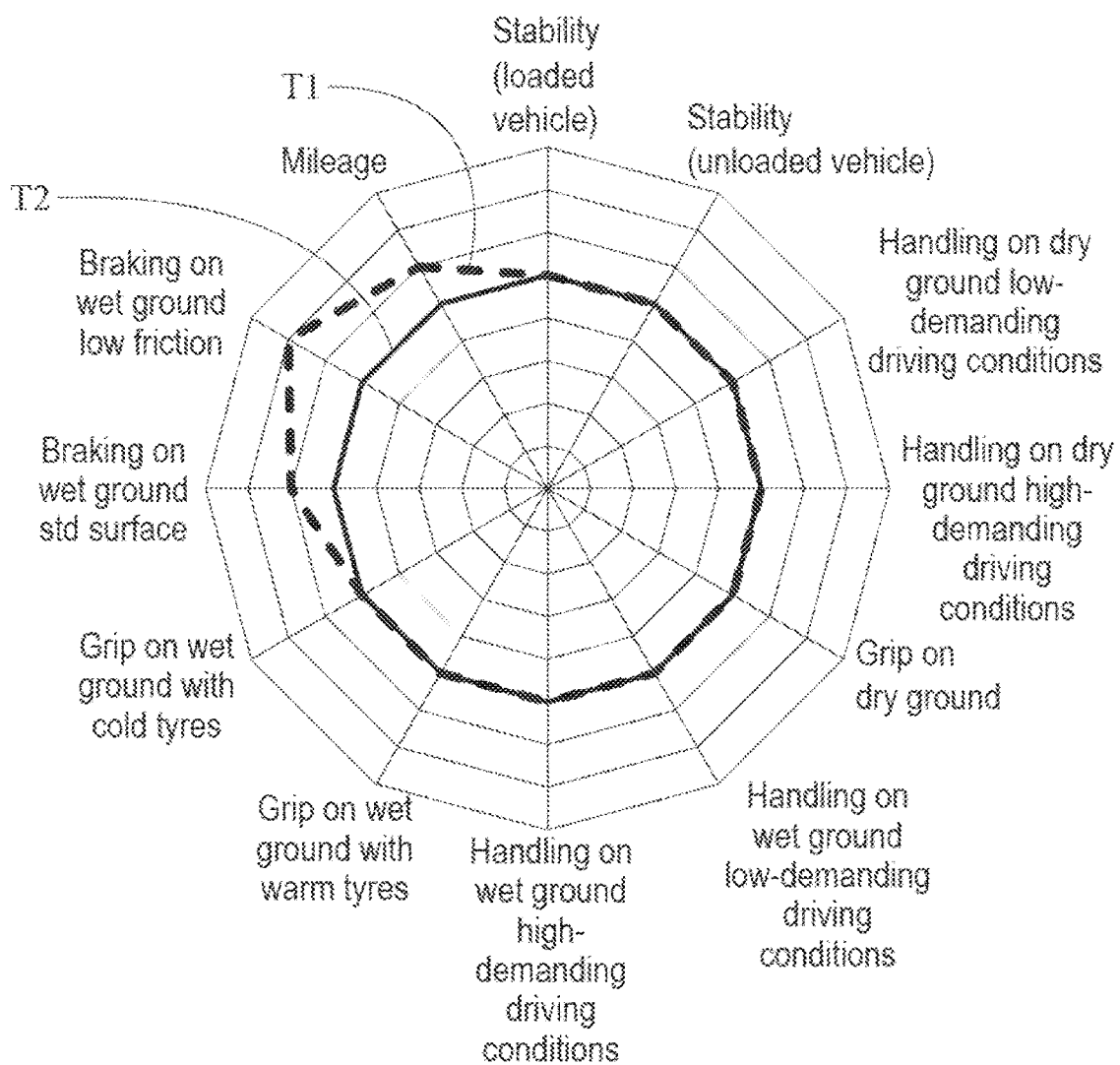
FIG. 4 shows a so-called radar diagram of the performance of a tyre according to the invention as compared to that of a tyre according to the prior art.

Different samples of the tyre according to an embodiment of the present invention, and particularly having the tread shown in FIGS. 3 and 4, were made.

A pair of tyres (T1), respectively a front tyre and a rear tyre, wherein the rear tyre is a rear tyre according to the invention, have been subjected to comparative tests with a pair of comparative tyres (T2) presently marketed by the Applicant (Metzeler Roadtec™ Z8 Interact™) and appreciated by the customers, particularly for their high mileage combined with a high grip, a reduced braking distance and the safety level on wet ground.

The front tyres had size 120/70 ZR 17 and an inflation pressure of 2.25 bars, whereas the rear tyres had size 180/55 ZR 17 and an inflation pressure of 2.5 bars.

The tests were carried out by equipping a 1250 cc Suzuki Bandit motorcycle with the pairs of tyres under comparison.

In FIG. 5 are reported in a radar diagram the mean evaluations obtained with six pairs of tyres T1, wherein the rear tyre is a tyre according to the invention, as compared to six pairs of comparison tyres T2.

The following parameters were evaluated: stability with loaded vehicle, stability with unloaded vehicle, mileage, handling on dry ground, handling on dry ground with sporty driving style, grip on dry ground, handling on wet ground, handling on wet ground with sporty driving style, grip on wet ground with cold tyres, grip on wet ground with warm tyres, braking on wet ground with standard road surface and braking on wet ground with low friction road surface.

Such evaluations are expressed as a comparison of the parameters of the set of tyres T1 (invention) with the same parameters of the set of reference tyres T2.

In particular, the evaluation of the twelve parameters mentioned above for the set of reference tyres T2 determines the base dodecagon, represented by a solid line in FIG. 5, with which the dodecagon representing the twelve parameters for the set of tyres T1 (rear tyre according to the invention), represented by a dashed line in FIG. 5, has to be compared.

Each vertex of the dodecagon represents one of the parameters which have been evaluated.

In the present case, the superposition of the two dodecagons at one vertex means a substantially equal performance, as far as that parameter is concerned, of the set of reference tyres T2 and the set of tyres T1 (rear tyre according to the invention). The condition in which the vertex of the dodecagon representing the set of tyres T1 (rear tyre according to the invention) is located radially more outside than the vertex of the set of reference tyres T2 means instead a better performance, as far as that parameter is concerned, of the set of tyres T1. The set of tyres T1 (rear tyre according to the invention) has substantially the same behavior as the reference set T2 as far as stability with loaded vehicle, stability with unloaded vehicle, handling on dry ground, handling on dry ground with sporty driving style, grip on dry ground, handling on wet ground, handling on wet ground with sporty driving style, grip on wet ground with cold tyres, grip on wet ground with warm tyres are concerned, and a better behavior than the set T2 as far as mileage, braking on wet ground with standard road surface and braking on wet ground with low friction road surface are concerned.

As it can be seen, keeping other structural features of the tyre the same, the contribution given by the tread pattern is important for obtaining a good performance when braking on wet ground, particularly with low friction road surfaces, and gaining mileage, without limiting the driving features of the tyre on dry ground and its stability and grip on wet ground.

The Applicant carried out also another series of tests, in which the set of tyres as described in the previous tests were compared in drive tests on track performing different maneuvers.

Table 1 summarizes the score sheet of the test driver. The results of these tests are expressed as a comparison of the tyres T1 with the set of reference tyres T2, considered as a base. The values reported in the following table are a mean value of the results obtained in several test sessions (6 tests).

In the present case, the symbol "=" indicates the performance level, which is considered to be already high, of the set of tyres T1 taken as a reference, the symbol "+" indicates a better performance than the reference set. On the contrary, a worse performance than the reference set is indicated by "−".

TABLE 1

| Parameters | T2 Reference tyre | T1 Tyre according to the invention |
|---|---|---|
| stability with loaded vehicle | = | = |
| stability with unloaded vehicle | = | = |
| handling on dry ground | = | = |
| handling on dry ground with sporty driving style | = | = |
| grip on dry ground | = | = |
| handling on wet ground | = | = |
| handling on wet ground with sporty driving style | = | = |
| grip on wet ground with cold tyres | = | = |
| grip on wet ground with warm tyres | = | = |
| braking on wet ground with standard road surface | = | ++ |
| braking on wet ground with low | = | ++ |

TABLE 1-continued

| Parameters | T2 Reference tyre | T1 Tyre according to the invention |
|---|---|---|
| friction road surface mileage | = | ++ |

The tyre T1 according to the invention showed a better performance than the already very good comparison tyre T2 as far as both mileage and stability when braking on wet ground, particularly in low friction conditions, are concerned.

The present invention has been described with reference to some embodiments thereof. Many modifications can be made in the embodiments described in detail, still remaining within the scope of protection of the invention, defined by the following claims.

The invention claimed is:

1. A motorcycle tyre, comprising:
an equatorial plane; and
a tread band comprising a plurality of grooves that define a tread pattern with an overall void-to-rubber ratio equal to or greater than 10%,
wherein:
the tread band comprises a plurality of pairs of primary grooves and a plurality of pairs of groups of secondary grooves,
the pairs of primary grooves are repeated along a direction of circumferential development of the tyre,
the primary grooves of each pair are mutually oppositely inclined relative to the equatorial plane,
the primary grooves extend away from the equatorial plane and have a first inclination angle relative to the equatorial plane that is smaller than 90°,
the primary grooves have a length equal to or greater than 50% of a width of the tread band,
each group of secondary grooves comprises at least two secondary grooves,
the secondary grooves of each group are located between the primary grooves to extend axially away from the equatorial plane, and have second inclination angles relative to the equatorial plane that are greater than 90°,
the secondary grooves of each group are located substantially along a partially curved line that crosses at least two primary grooves,
the secondary grooves of a same group of secondary grooves are interposed between circumferentially consecutive primary grooves, to provide at least one secondary groove between two circumferentially consecutive primary grooves, and
each primary groove of the pairs of primary grooves comprises:
a starting first inclination angle, close to an end of said primary groove that points towards the equatorial plane, that is substantially equal to 20°; and
a final first inclination angle, close to an end of said primary groove that points towards a shoulder of the tyre, that is substantially equal to 40°.

2. The motorcycle tyre according to claim 1, wherein the secondary grooves do not intersect circumferentially adjacent primary grooves.

3. The motorcycle tyre according to claim 1, wherein the second inclination angles decrease for secondary grooves moving away from the equatorial plane.

4. The motorcycle tyre according to claim 1, wherein each secondary groove has a length equal to or smaller than 5% of the width of the tread band.

5. The motorcycle tyre according to claim 1, wherein the partially curved line is counter-inclined relative to the primary grooves.

6. The motorcycle tyre according to claim 1, wherein each secondary groove has a depth equal to or smaller than 5 mm.

7. The motorcycle tyre according to claim 1, wherein each secondary groove that is located close to a shoulder of the tyre, has a distance from the shoulder that is equal to or greater than 20% of the width of the tread band.

8. The motorcycle tyre according to claim 1, wherein the second inclination angle for secondary grooves located close to a shoulder of the tyre are equal to or smaller than 135°.

9. The motorcycle tyre according to claim 1, wherein circumferentially consecutive primary grooves do not intersect.

10. The motorcycle tyre according to claim 1, wherein each primary groove of the pairs of primary grooves has a width that increases with said primary groove moving away from the equatorial plane.

11. The motorcycle tyre according to claim 1, wherein the primary grooves have a width greater than a width of the secondary grooves.

12. The motorcycle tyre according to claim 5, wherein the second inclination angles for secondary grooves located close to the equatorial plane are greater than 160°.

13. The motorcycle tyre according to claim 1, wherein a contribution of the secondary grooves to the overall void-to-rubber ratio is equal to or less than 6%.

14. The motorcycle tyre according to claim 1, wherein the tread band further comprises a central annular portion located across the equatorial plane, the central annular portion having a void-to-rubber ratio equal to or smaller than 1%.

15. The motorcycle tyre according to claim 1, further comprising:
two shoulder annular portions opposed to each other relative to the equatorial plane and located at outer edges of the tyre, each of the two shoulder annular portions having a void to rubber ratio equal to or smaller than 1%.

16. The motorcycle tyre according to claim 1, wherein the overall void-to-rubber ratio is equal to or greater than 12%.

17. The motorcycle tyre according to claim 1, wherein each secondary groove has a length equal to or smaller than 3% of the width of the tread band.

18. The motorcycle tyre according to claim 1, wherein each secondary groove has a depth equal to or smaller than 3 mm.

19. A motorcycle tyre, comprising:
an equatorial plane; and
a tread band comprising a plurality of grooves that define a tread pattern with an overall void-to-rubber ratio equal to or greater than 10%,
wherein:
the tread band comprises a plurality of pairs of primary grooves and a plurality of pairs of groups of secondary grooves,
the pairs of primary grooves are repeated along a direction of circumferential development of the tyre,
the primary grooves of each pair are mutually oppositely inclined relative to the equatorial plane,
the primary grooves extend away from the equatorial plane and have a first inclination angle relative to the equatorial plane, that is smaller than 90°, the primary grooves have a length equal to or greater than 50% of a width of the tread band, each primary groove of each pair has a respective primary groove extension in the direction of the circumferential development of the tyre so that respective primary groove extensions of circumferentially adjacent primary grooves overlap, each group of secondary grooves comprises at least two secondary grooves, each group of secondary grooves has a respective group extension in the direction of the circumferential development that overlaps the primary groove extensions of the circumferentially adjacent primary grooves, the secondary grooves of each group are located between the primary grooves to extend axially away from the equatorial plane and are counter-inclined relative to the primary grooves with second inclination angles relative to the equatorial plane that are greater than 90°, and each primary groove of the pairs of primary grooves comprises:
- a starting first inclination angle, close to an end of said primary groove that points towards the equatorial plane, that is substantially equal to 20°; and
- a final first inclination angle, close to an end of said primary groove that points towards a shoulder of the tyre, that is substantially equal to 40°.

* * * * *